UNITED STATES PATENT OFFICE

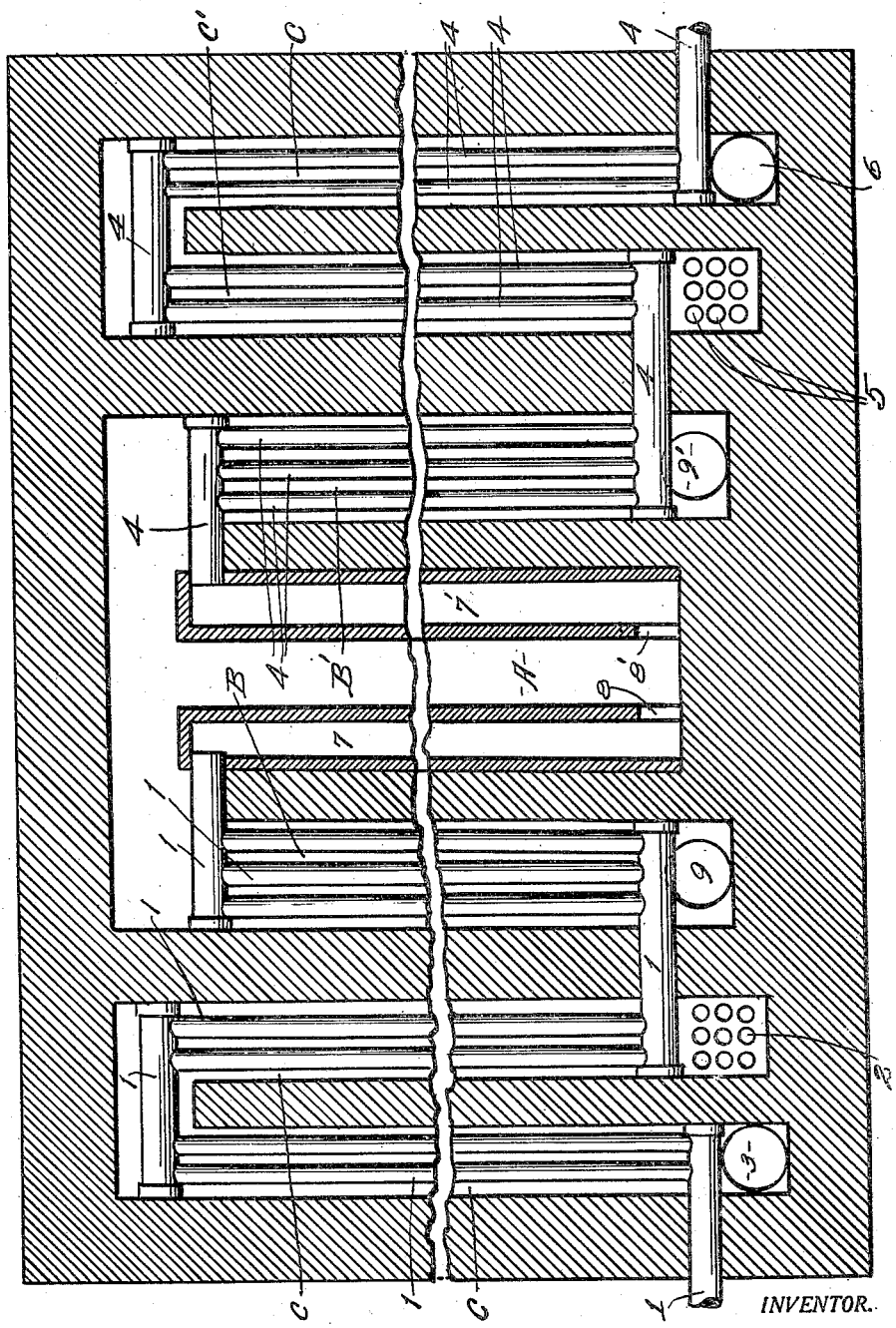

WILLIAM D. WILCOX, OF LAWRENCE, KANSAS

PROCESS OF DISSOCIATING HYDROCARBON GASES AND VAPORS TO PRODUCE A MIXTURE OF NITROGEN AND HYDROGEN IN DETERMINED PROPORTIONS

Application filed June 28, 1930. Serial No. 464,690.

The purpose of my invention is to make hydrocarbon gases and vapors, such as natural gas, cracking still gases, coke oven gas, etc., readily available by an inexpensive procedure for the production of a mixture of nitrogen and hydrogen free of other components and suitable for use in the synthesis of ammonia.

Dissociation of hydrocarbons in admixture with steam by subjection to a high temperature has been employed commercially over a long period of years. Assuming for the purpose of simplicity in illustration, that methane be the hydrocarbon treated, what takes place may be represented by the equation $$CH_4 + H_2O + heat = CO + 3H_2.$$

It may fairly be said that in the various commercial applications of this reaction, it will not be found that a complete dissociation of the hydrocarbons has been effected. There remains in admixture with the hydrogen and oxides of carbon a greater or less proportion of undecomposed hydrocarbons. In many situations, as for example, where the resultant gas is used as a fuel, as a step toward obtaining hydrogen for the inflation of balloons, etc., the presence of a small per cent of methane is not a matter of consequence. But when the gas is to be used for the synthesis of ammonia, such undecomposed hydrocarbons even in a very small proportion, are seriously objectionable. Temperatures are readily creatable in excess of that at which, equilibrium conditions being attained, the dissociation of the hydrocarbons would be complete; but as their proportion is diminished, relative to the resultant gases, the rate of reaction becomes so slow that at any temperature readily obtained, the achievement of equilibrium becomes commercially impracticable. Heat may be imparted to the mixture of hydrocarbons and steam through enclosing walls, or they may be heated by being brought in contact with hot surfaces such as incandescent coke or refractory brick brought to high temperature by precedent blasting. Up to a recent period at least, the employment of external heating has been handicapped by the lack of metal pipes capable of withstanding the temperatures required, and where refractory materials of relatively poor conductivity have been substituted, the travel of heat from their exterior surfaces inward has been so slow and the heat differential required so great as to make the thermal efficiency of the procedure very poor. For this reason heating by contact with previously heated surfaces has been the general practice. This has its disadvantages. The process is intermittent. Since, in the situation under discussion, the reaction is highly endothermic or heat absorbing, the temperature of the contact surfaces is quickly reduced, and even when the reaction period is brief, the results in the later part of the period are likely to be unsatisfactory.

My procedure has the advantage of being continuous, of permitting the maintenance of uniform conditions during operation, of being carried on with a high degree of thermal efficiency, and at a rapid rate, and of securing a complete dissociation. I prefer to heat by external means. The mixture of hydrocarbons and steam, as for example, $10CH_4 + 10H_2O$ is passed through pipes of heat resistant alloy placed within a fuel fired furnace. The gaseous mixture travels counter current to the flow of heating gases so that a high efficiency of heat transfer is obtained. Based on my own experience and a quite wide knowledge of the results obtained by others, I feel justified in saying that maximum temperatures of the gas may be created within the range of 1800-2000° F. The rate of heat input and of the travel of the gas through the pipes is closely controlled so as to secure a practically continuous 90% dissociation. $10CH_4 + 10H_2O$ would then become $$9CO + 1CH_4 + H_2O + 27H_2.$$

We have now put before us the necessity of dissociating the remaining 1 volume of methane, and of adding to the mixture a proportion of nitrogen equal to one-third the volume of hydrogen finally obtained, and of eliminating any oxides of carbon.

In my process, I am simultaneously heating a volume of air sufficient to supply this nitrogen. Since no exothermic reactions take place in this heating, I find it readily possible to heat the air to 2000° F. or higher. The required volume relative to the 10 volumes of methane assumed to be subjected to dissociation will be 14.3, containing 3 parts of $O_2$ and 11.3 parts of nitrogen. This volume is entirely inadequate to form an explosive mixture with, or to effect a completed combustion of the gaseous mixture, but where they are brought together preheated to 1800° F. or higher, the oxygen present in the air readily unites preferably with carbon to form carbon monoxide; next with hydrogen in preference to union with carbon monoxide to form dioxide. It is highly important that the most intimate and uniform admixture be secured at the moment of their union. The reactions which result are indicated by the following equation:

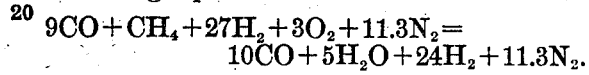

$$9CO + CH_4 + 27H_2 + 3O_2 + 11.3N_2 = 10CO + 5H_2O + 24H_2 + 11.3N_2.$$

There is generated sufficient heat to raise the temperature of the mixture around 1300° F. less only such heat as may be absorbed by some excess $H_2O$ present and the diminution due to the increase in specific heat of gases with rise in temperature. A temperature is created such as would be practically impossible to create by external heating or passage through preheated chambers. At this temperature the complete dissociation of any hydrocarbons takes place at a rapid rate. The sensible heat in the gas in largely utilized to preheat the entering gases. In order to effect this they are passed prior to withdrawal in contact with the exterior of the pipes through which the gas-steam mixture and the air are being brought together, as may readily be seen from the accompanying drawing.

Passing from the chamber in which dissociation is completed, the hot gases may be reduced in temperature by spraying with water or the addition of steam at boiler temperature, to 900° F., at which, with the excess of steam so provided, the carbon monoxide can be converted to dioxide by contact with an activated iron catalyst, with an increase in the volume of hydrogen according to the equation $CO + H_2O = CO_2 + H_2$. Taking into account some lack of completeness in this reaction and minor losses of hydrogen in scrubbing out the $CO_2$, the proportions of nitrogen and hydrogen in the final product will be very nearly in the ratio of one and three. Knowing the composition of the hydrocarbons used, and taking into account nitrogen which may be present with them, the percentage of initial dissociation and the proportion of air added may be readily controlled so as to secure equivalent results.

I do not limit myself in carrying out this process to the use of external heat in the preliminary dissociation,—the cyclic process may be employed,—nor do I limit myself to a particular design of plant or to the use of metal tubes as means of conveying the gas and air; but to make my process more readily understood, I am filing with this application a drawing which shows a vertical cross section of a preferred form of plant, and will describe its operation with some degree of detail.

A is the chamber in which the partially dissociated gas issuing from 7 through 8 is united with the heated air issuing from 7' through 8'. The highly heated gas passes up A and down B and B', passing out through 9 and 9'. Hydrocarbon gases with a volume of steam somewhat in excess of that necessary to supply an atom of oxygen to each atom of carbon in the gas is continuously admitted to system of pipes 1 set in chamber C. Simultaneously, combustible gas is admitted from burner 2 and passes counter current through C to outlet 3. The rate of combustion will be so controlled as to supply the heat required to sustain the exothermic reactions within 1, and to pass the gas into B at a temperature in excess of 1800° F.

Simultaneously, air in a determined proportion relative to the volume of gas admitted is passed in to chamber C, through system of pipes 4; is preheated prior to entering B, to a high temperature by the heat of the combustion gases which issue from gas burner 5, and which pass counter current to outlet 6. A considerable degree of additional heat will be imparted to both the gas and air in passing respectively through chambers B and B' and down flues of refractory material 7 and 7'. This absorption of heat will not reduce the ultimate temperature attained in A, but rather increase it, as this ultimate temperature is that resulting from adding the heat generated by partial combustion in A to the heat existing as sensible in the gas and air as they issue from 8 and 8'.

I am aware that temperatures are likely to be created at which the use of the most highly resistant metallic alloys may become impractical in B and B'. I may be compelled to substitute passages enclosed by refractory materials. Use of refractories in C, in which the air is preheated, may be found the better practice, but I strongly desire to use metal tubes in C to the extent which is found possible in order to obtain the catalytic effect of the metal in promoting the water gas reaction and to facilitate the use of nickel as a catalyst as described in my pending application No. 371,602.

What I claim as new and desire to protect by the issuance to me of Letters Patent is:

1. The process of obtaining a mixture of nitrogen and hydrogen in determined proportions by the dissociation of hydrocarbon gases and vapors, which comprises passing a mixture of hydrocarbon gases with a volume of steam sufficient to supply the oxygen for the oxidation of the carbon in the hydrocarbon gases to carbon monoxide, through a conduit heated to a temperature in excess of 1800° F., thereby effecting a partial dissociation, simultaneously heating a volume of air, sufficient to supply the required proportion of nitrogen in an independent conduit, to a temperature in excess of that at which ignition will take place, bringing the gas and air into intimate mixture in a combustion chamber, withdrawing the resultant product and removing the oxides of carbon.

2. The steps in the process of obtaining a mixture of nitrogen and hydrogen in determined proportions by the dissociation of hydrocarbon gases and vapors, which comprises passing a mixture of hydrocarbon gases with steam in a proportion adequate to oxidize the carbon of the hydrocarbons to carbon monoxide through a conduit heated to a temperature in excess of 1800° F., thereby effecting a partial dissociation of the hydrocarbon gas and steam, simultaneously heating a volume of air, adequate to supply the required proportion of nitrogen in an independent conduit, to a temperature in excess of that at which ignition will result and bringing the gas and air into intimate mixture in a combustion chamber.

3. The process of obtaining a gaseous mixture of nitrogen and hydrogen in the volumetric proportion of one and three by the dissociation of hydrocarbon gases and vapors, which comprises passing a mixture of hydrocarbon gases with steam in a proportion sufficient to oxidize the carbon of the hydrocarbons to monoxide, through a conduit heated to a temperature in excess of 1800° F., thereby effecting a partial dissociation of the hydrocarbon gases and steam, simultaneously heating a volume of air such as will provide a volume of nitrogen one-third that of the volume of hydrogen in the recovered gas to a temperature in excess of that at which ignition with hydrocarbon gases takes place, bringing the gas and air into intimate mixture within an exclosing chamber, withdrawing the resultant product from the chamber, adding steam in excess, reducing the temperature, converting the carbon monoxide to carbon dioxide by passing the gas through a suitable catalyst and removing the carbon dioxide.

4. The process of obtaining a mixture of nitrogen and hydrogen in determined proportions by the dissociation of hydrocarbon gases and vapors, which comprises passing a mixture of hydrocarbon gases and steam through an externally heated conduit, bringing the mixture to a temperature in excess of 1800° F. and effecting a partial dissociation, simultaneously heating a volume of air to a temperature in excess of that at which ignition with combustible gas will take place, bringing the gas and air into intimate mixture within an enclosing chamber in such proportions that the volume of nitrogen in the air will have the desired relation to the volume of hydrogen in the final product, withdrawing the resultant gas, supplying additional steam, converting the carbon monoxide to carbon dioxide by passage of the gas through a suitable catalyst and removing the carbon dioxide from the gas.

5. The steps in the process of obtaining a mixture of nitrogen and hydrogen in determined proportions by the dissociation of hydrocarbon gases and vapors, which comprises passing a mixture of hydrocarbon gases and steam in controlled proportions through an externally heated conduit, thereby bringing them to a temperature in excess of 1800° F. and effecting a partial dissociation of the gas and steam, simultaneously heating air to a temperature at which the oxygen therein will unite with the combustibles in the gas-steam mixture, bringing the gas and air into intimate mixture within an enclosed combustion chamber in such proportion that the nitrogen of the air will be in the desired proportion to the hydrogen in the conserved product, passing the hot gases from the combustion chamber in contact with the exterior of the conduit in counter current flow with the entering gases.

6. The process of obtaining a mixture of nitrogen and hydrogen in determined proportions by the dissociation of hydrocarbon gases and vapors, which comprises passing a mixture of hydrocarbon gases and steam through an externally heated conduit, bringing the gaseous mixture to a temperature in excess of 1800° F. and effecting a partial dissociation, simultaneously heating air by passing it through an externally heated conduit to a temperature in excess of that at which oxygen unites with hydrocarbon gases, bringing the gas and air into intimate mixture in an enclosing combustion chamber in such proportions that the nitrogen of the air will be in the desired volumetric ratio to the hydrogen in the final product, passing the gases from the combustion chamber in contact with the exterior surfaces of a section of the heated conduit, counter current to the flow of the gases within the conduit, thereafter removing the oxides of carbon from the gas.

7. The improvement in the process of obtaining a mixture of nitrogen and hydrogen in determined proportions by the dissociation of hydrocarbon gases and vapors, which comprises passing a mixture of gas and steam through an externally heated conduit, bringing the mixture to a temperature in excess of 1800° F. and effecting a partial dissociation, simultaneously heating air to a temperature in excess of that at which union of the oxygen with combustible gas takes place, bringing the gas and air passed through an independent conduit into intimate mixture in a combustion chamber in such proportions that the nitrogen in the air will bear the desired volumetric ratio to the hydrogen in the recovered product, utilizing the hot resultant gases to supply part of the heat required for the initial heating of the gas and air.

In witness whereof, I affix my signature.

WILLIAM D. WILCOX.